3,479,330
1-OLEFIN POLYMERIZATION PROCESS AND
CATALYST
Gerald R. Kahle and Lawrence M. Fodor, Bartlesville,
Okla., assignors to Phillips Petroleum Company, a corporation of Delaware
No Drawing. Filed Feb. 14, 1966, Ser. No. 527,056
Int. Cl. C08f 3/02
U.S. Cl. 260—93.7         10 Claims

ABSTRACT OF THE DISCLOSURE

An increased yield of 1-olefin polymers is obtained by carrying out the polymerization in the presence of an organometal modified catalyst system formed by admixing (A) an organoaluminum compound of the formula $R_nAlX_{3-n}$ wherein R is alkyl, cycloalkyl, aryl or combinations thereof having up to 20 carbon atoms, X is a halogen and $n$ is 1, 1.5, 2 or 3; (B) a titanium trichloride-aluminum trichloride complex resulting from the reaction of titanium tetrachloride and aluminum and having the approximate formula $TiCl_3 \cdot \frac{1}{3}AlCl_3$; and (C) a phosphonitrilic halide of the formula $(PNX_2)_m$ wherein X is a halogen, preferably chlorine and $m$ has a value of 3 to 100.

---

This invention relates to the polymerization of olefins to form solid polymers. In one aspect it relates to improved catalysts for such a polymerization. In another aspect it relates to a process for producing solid polymers of olefins so as to obtain improved yield, improved polymer flexural modulus and/or improved xylenes-soluble content of the polymer.

Polymers of alpha-olefins, particularly of propylene, have long been known and numerous procedures have been disclosed for their production. These polymers are characterized by a greater or lesser degree of stereospecificity, i.e., the presence of a certain amount of a crystalline component frequently designated as isotactic polymer. Many of the useful properties of these polymers such as ultimate tensile, hardness, range of melting temperature, etc., appear to depend upon the stereospecificity of the polymer. Flexural modulus, a property readily measurable by standard procedures, provides a reliable and consistent means for characterizing these polymers. The higher the stereospecificity of a polymer, the higher the flexural modulus values are found to be. For a commercially attractive product, flexural modulus values must be high, preferably above 200,000 p.s.i. and more preferably above 225,000 p.s.i. Heretofore it has frequently been necessary to extract amorphous fractions of the polymer in order to provide products having flexural moduli in this range. It is therefore highly desirable to minimize the production of amorphous polymer, as measured for example by the amount of polymer soluble in mixed xylenes.

Another requirement for these polymerization procedures is a high level of productivity of polymer based on catalyst. The stereospecific catalyst systems used in these operations are expensive and cannot be regenerated. Thus, a high productivity in pounds of useful polymer per pound of catalyst is an important feature of any commercially attractive process.

An object of this invention is to provide an improved process for the production of olefin polymers.

Another object of this invention is to provide a polymerization process in which there is obtained an increase in polymer yield, an increase in flexural modulus and/or a decrease in the xylene-soluble content of the polymer.

A further object of this invention is to provide novel catalyst systems which when employed in a polymerization process results in the improving of the polymer yield, flexural modulus and/or xylenes-solubles of the resulting polymer.

Other aspects, objects and the several advantages of this invention will be apparent to those skilled in the art upon consideration of this disclosure.

According to our invention, we have discovered that 1-olefin polymers can be obtained in improved yields with increased flexural modulus and/or decreased xylenes-soluble content when the polymerization is conducted in the presence of an organometal modified catalyst system formed by admixing (A) an organoaluminum compound of the formula $R_nAlX_{3-n}$ where R is alkyl, cycloalkyl, aryl or combinations thereof having up to 20 carbon atoms, X is a halogen and $n$ is 1, 1.5, 2 or 3, (B) a titanium trichloride-aluminum trichloride complex resulting from the reaction of titanium tetrachloride and aluminum and having the approximate formula $TiCl_3 \cdot \frac{1}{3}AlCl_3$, and (C) a phosphonitrilic halide of the formula $(PNX_2)_m$ wherein X is a halogen, preferably chlorine and $m$ has a value of 3 to 100.

The enumeration of alkyl, cycloalkyl and aryl radicals herein in defining the formulas is intended to include the various mixed radicals such as alkaryl, aralkyl, alkylcycloalkyl, cycloalkylaryl, and the like.

The compounds represented by the formula $R_nAlX_{3-n}$ and utilized as component (A) of the catalyst system are well known in the art. Examples are triethylaluminum, diethylaluminum chloride, ethylaluminum dichloride, ethylaluminum sesquichloride, and the like.

The titanium chloride-aluminum chloride complex utilized as component B of the catalyst system according to this invention is also well known in the art. It can be formed by reacting titanium tetrachloride with metallic aluminum. The complex can be represented by the formula $TiCl_3 \cdot \frac{1}{3}AlCl_3$.

The phosphonitrilic halides used as the third component in the catalysts of our invention are prepared, for example, by reaction of ammonium chloride and phosphorus pentachloride. They have the empirical formula $(PNX_2)_m$ in which $m$ can have values ranging from 3 to 100, or mixtures thereof. When the halogen is chlorine and $m$ is 3 or 4, the polymer is a crystalline cyclic solid. When $m$ has a higher value, for example 5 to 11, the polymers are oils and are also believed to be cyclic. It is also within the scope of our invention to use still higher polymers of many connected rings, which can be made by heating or by mechanical or chemical treatment of the lower polymers.

Broad and preferred ranges for the molar ratio of the catalyst components are:

| Ratio to $TiCl_3 \cdot \frac{1}{3}AlCl_3$ | Broad | Preferred |
|---|---|---|
| $R_nAlX_{3-n}$ | 0.5:1 to 10:1 | 1:1 to 7.5:1 |
| Phosphonitrilic halide | 0.05:1 to 5:1 | 0.1:1 to 3:1 |

The total catalyst concentration is usually within the range 0.005 to 10 weight percent of the olefin being polymerized, but concentrations outside this range are operative.

The polymerization reaction is carried out either in a mass system—i.e., the liquid propylene acts as reaction medium—or in an inert hydrocarbon diluent, such as a paraffin, cycloparaffin, or aromatic hydrocarbon having up to 20 carbon atoms per molecule. Examples of hydrocarbons that can be used are pentane, hexane, heptane, isooctane, eicosane, cyclohexane, methylcyclopentane, benzene toluene, naphthalene, anthracene, and the like. Where an inert diluent is used the volume ratio of diluent to propylene is in the range of 1:1 to 10:1, preferably 3:1 to 7:1.

The polymerization is conducted at temperatures in the range 80 to 250° F., preferably 100 to 200° F. The pressure is sufficient to maintain the reaction mixture substantially in liquid phase. The reaction time is in the range 10 minutes to 75 hours, more frequently 30 minutes to 25 hours.

Although the invention is illustrated by the polymerization of propylene, any aliphatic 1-olefin having up to 8 carbon atoms per molecule can be used. Preferably those having 3 to 7 carbon atoms are used, such as propylene, 1-butene, 1-hexene, 4-methyl-1-pentene, and the like.

It is within the scope of the invention to use hydrogen in a concentration of about 0.08 to 0.50 mole percent of the propylene, calculated as the amount present in the liquid phase, for controlling the molecular weight of the polymer.

The following examples will further illustrate the invention, although it is not intended that the invention be limited thereto.

EXAMPLE

Data illustrating the process of the invention were obtained by polymerizing about 50 ml. (25 grams) of propylene dissolved in 250 ml. (158 grams) of pentane in 21 to 72-hour runs at 122° F. and about 65 p.s.i.g., with or without added hydrogen.

The following results were obtained:

|  | Mol Ratio [1] | | | Catalyst, Wt. percent [2] | Hydrogen, mol percent | Conv., percent | Flexural Modulus,[3] p.s.i.×10⁻³ | Xylenes Soluble, Wt. percent [4] | Melt Flow [5] |
|---|---|---|---|---|---|---|---|---|---|
|  | $R_nAlX_{3-n}$ | $(PNCl_2)_3$ | $TiCl_2.1/3\ AlCl_3$ |  |  |  |  |  |  |
| Run No.: |  |  |  |  |  |  |  |  |  |
| 1 | 2 | 0 | 1 | 0.75 | 0 | 100 | 40 | 31.4 | 2.25 |
| 2 | 4 | 0.67 | 1 | 2.1 | 0 | 100 | 61 | 26.1 | 0.41 |
| 3 | 6 | 0.67 | 1 | 2.5 | 0 | 100 | 59 | 28.4 | 1.58 |
| 4 | 3 | 0 | 1 | 1.1 | 0.35 | 100 | 73 | 31.4 | 2.26 |
| 5 | 4 | 0.67 | 1 | 2.2 | 0.39 | 100 | 94 | 25.1 | 9.32 |
| 6 | 6 | 0.67 | 1 | 2.6 | 0.40 | 100 | 94 | 26.2 | 8.26 |
| 7 | 5 | 0 | 1 | 1.5 | 0 | 0 |  |  |  |
| 8 | 4 | 0.67 | 1 | 1.4 | 0 | 15 | 39 | 34.2 | 0.09 |

[1] $R_nAlX_{3-n}$ is triethylaluminum in Runs in 1-6 and is ethylaluminum dichloride in Runs 7-8.
[2] Based on propylene.
[3] ASTM D790-61.
[4] Determined by placing 0.95 g. of polymer in a centrifuge tube, adding 95 ml. mixed xylenes, heating for 15 minutes at 285° F., cooling, centrifuging, evaporating the solvent from a 25 ml. aliquot of the supernatant liquid, weighing the residue, and multiplying by 400.
[5] ASTM D1238-62T, Condition L.

The above data show:

(1) Properties of polymers made with the catalyst system in ethylaluminum $TiCl_3 \cdot 1/3\ AlCl_3$ are improved by addition of phosphonitrilic chloride ($m=3$), either in the presence or absence of hydrogen.

(2) The catalyst system ethylaluminum-dichloride $TiCl_3 \cdot 1/3\ AlCl_3$ is converted from a non-operable to an operable system by addition of phosphonitrilic chloride ($m=3$).

Reasonable variations and modifications of this invention can be made, or followed, in view of the foregoing disclosure, without departing from the spirit or scope thereof.

We claim:

1. A catalyst system formed on admixing (A) a compound of the formula $R_nAlX_{3-n}$ wherein R is alkyl cycloalkyl, aryl or combinations thereof having up to 20 carbon atoms, X is a halogen and n is 1, 1.5, 2 or 3, (B) a titanium trichloride-aluminum trichloride complex having the approximate formula $TiCl_3 \cdot 1/3\ AlCl_3$ and (C) a phosphonitrilic halide of the formula $(PNX_2)_m$ wherein X is a halogen and m is in the range of 3 to 100 and wherein the ratio of said $R_nAlX_{3-n}$ to said complex is in the range of 0.5:1 to 10:1 and the ratio of said phosphonitrilic halide to said complex is in the range of 0.05:1 to 5:1.

2. A catalyst system according to claim 1 wherein the value m is 3 or 4.

3. A catalyst system according to claim 1 wherein the value of m is in the range of 5 to 11.

4. A catalyst system according to claim 1 formed by admixing triethylaluminum, titanium trichloride-aluminum trichloride complex having the approximate formula $TiCl_3 \cdot 1/3\ AlCl_3$ and phosphonitrilic chloride having the formula $(PNCl_2)_3$.

5. A catalyst system according to claim 1 formed by admixing ethylaluminum dichloride, titanium trichloride-aluminum trichloride complex having the approximate formula $TiCl_3 \cdot 1/3\ AlCl_3$ and phosphonitrilic chloride having the formula $(PNCl_2)_3$.

6. A process which comprises polymerizing an aliphatic 1-olefin having from 3 to 8 carbon atoms per molecule in the presence of a catalyst which forms on mixing a compound of the formula $R_nAlX_{3-n}$ wherein R is alkyl, cycloalkyl, aryl or combinations thereof having up to 20 carbon atoms, X is a halogen and n is 1, 1.5, 2 or 3, (B) a titanium trichloride-aluminum trichloride complex having the approximate formula $$TiCl_3 \cdot 1/3\ AlCl_3$$

and (C) a phosphonitrilic halide of the formula $$(PNX_2)_m$$

wherein X is a halogen and m is in the range of 3 to 100 and wherein the ratio of said $R_nAlX_{3-n}$ to said complex is in the range of 0.5:1 to 10:1 and the ratio of said phosphonitrilic halide to said complex is in the range of 0.05:1 to 5:1.

7. A process according to claim 6 wherein said catalyst is formed by admixing triethylaluminum, titanium trichloride-aluminum trichloride complex having the approximate formula $TiCl_3 \cdot 1/3\ AlCl_3$ and phosphonitrilic chloride having the formula $(PNCl_2)_3$.

8. A process according to claim 6 wherein said catalyst is formed by admixing ethylaluminum dichloride, titanium trichloride-aluminum trichloride having the approximate formula $TiCl_3 \cdot 1/3\ AlCl_3$ and phosphonitrilic chloride having the formula $(PNCl_2)_3$.

9. A process according to claim 6 wherein the polymerization is carried out at a temperature in the range of 80 to 250° F. at a pressure sufficient to maintain the reaction mixture in the liquid phase.

10. A process according to claim 6 where hydrogen is present in a concentration of about 0.08 to 0.50 mole percent of olefin.

References Cited

UNITED STATES PATENTS 3,088,942   5/1963   Coover _____ 260—93.7
3,072,629   1/1963   Coover et al. _____ 260—93.7

JAMES A. SEIDLECK, Primary Examiner

U.S. Cl. X.R.

252—429; 260—94.9